Oct. 29, 1935.   C. B. SPASE   2,019,198
VIBRATION DAMPENING MOTION TRANSMITTING ELEMENT OR CLUTCH
Filed Jan. 21, 1933   3 Sheets-Sheet 2
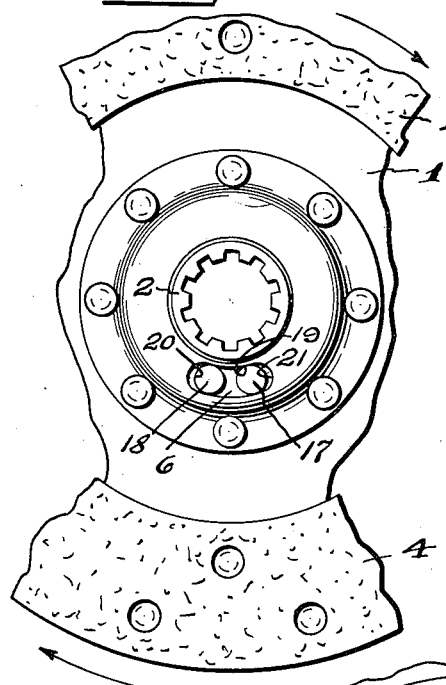
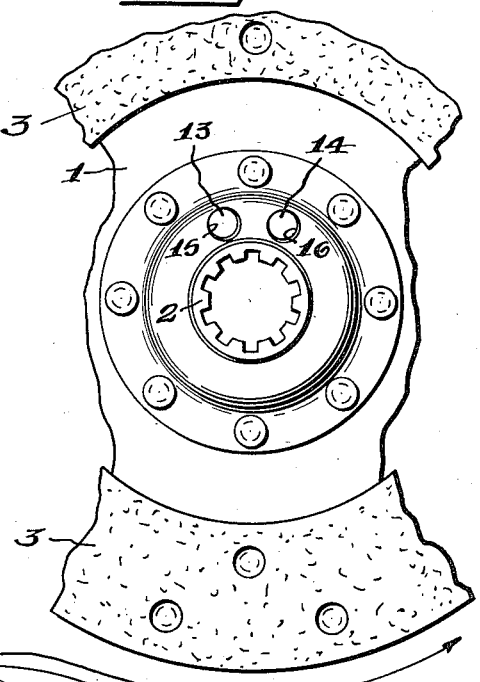
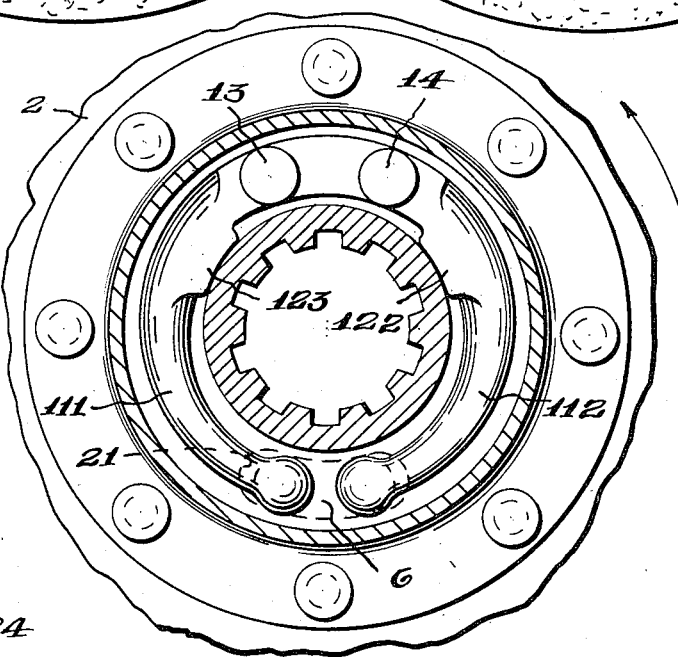
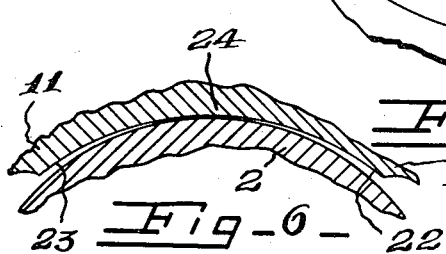
INVENTOR.
Charles B. Spase
BY
Bodell & Thompson
ATTORNEYS.

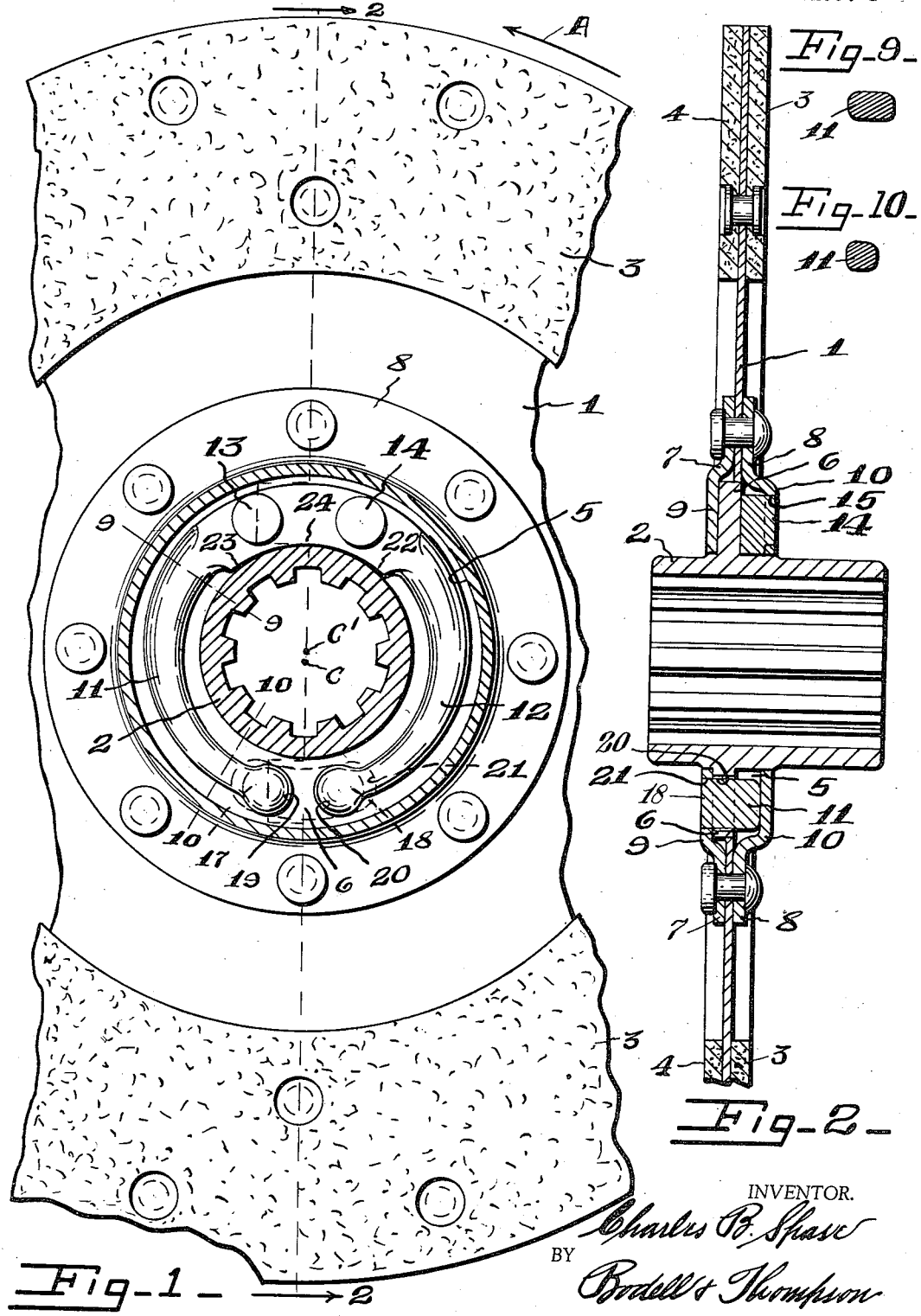

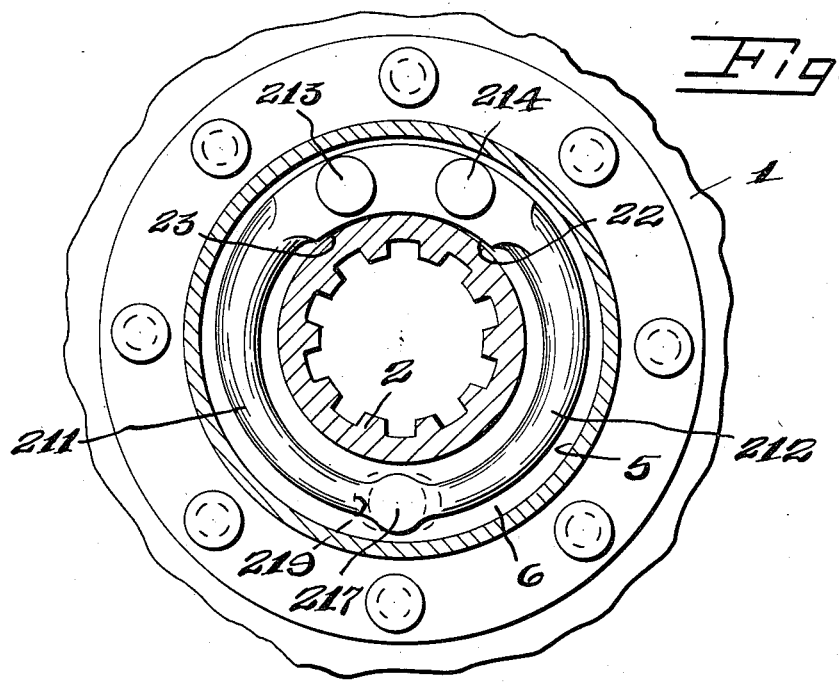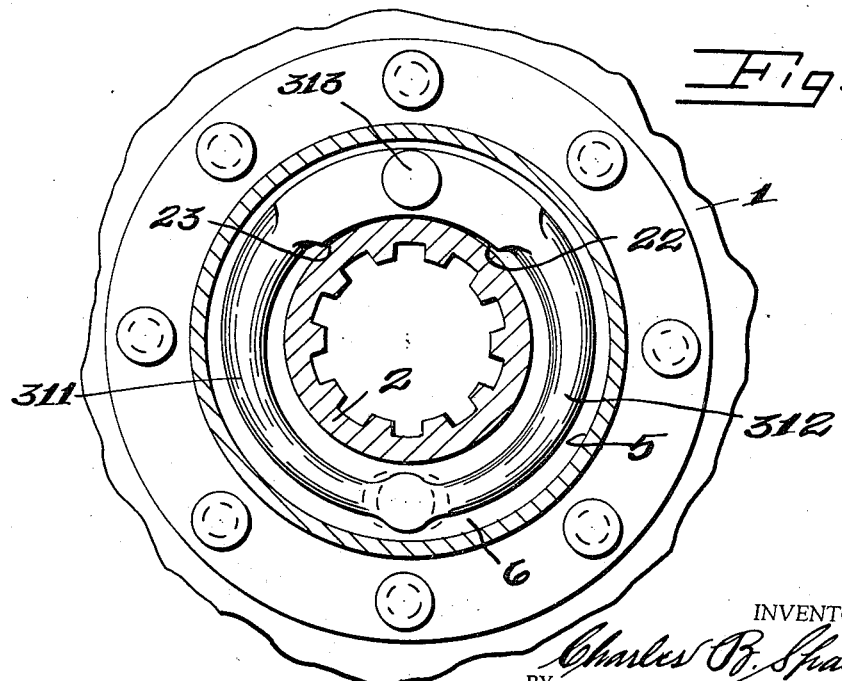

Patented Oct. 29, 1935

2,019,198

UNITED STATES PATENT OFFICE 2,019,198

VIBRATION-DAMPENING MOTION-TRANSMITTING ELEMENT OR CLUTCH

Charles B. Spase, Nedrow, N. Y., assignor to W. C. Lipe Inc., Syracuse, N. Y., a corporation of New York Application January 21, 1933, Serial No. 652,842

10 Claims. (Cl. 64—100)

This invention relates to vibration absorbing means for motion transmitting elements, and particularly for the driven clutch elements used in motor vehicles for transmitting the motion of the crank shaft of the engine to the propeller shaft of a motor vehicle through the transmission gearing, and has for its object a particularly simple vibration- or torque-dampening motion transmitting means between the driving and driven parts of the driven member of the clutch.

It further has for its object a vibration dampening means which acts with a snubbing action.

It further has for its object a vibration dampening means which acts with a snubbing action on one of the members of the clutch element only, preferably, the inner member or hub on the driven shaft.

It further has for its object a torque vibration dampener means which is double acting and consists of but a single member, one half of which acts when the impulse is from the driving or outer member to the inner and the other half of which acts when the impulse is from the driven or inner member to the driving member.

The invention consists in the novel features and in the combinations and constructions hereinafter set forth and claimed.

In describing this invention, reference is had to the accompanying drawings in which like characters designate corresponding parts in all the views.

Figure 1 is a fragmentary elevation, partly in section, of a clutch plate embodying this invention.

Figure 2 is a sectional view on line 2—2, Figure 1.

Figures 3 and 4 are opposite fragmentary elevations on a reduced scale of the clutch plate.

Figure 5 is a view similar to Figure 1 showing a slightly modified form of the invention.

Figure 6 is an enlarged diagrammatic view illustrating the normal relation between the brake shoe surface and the surface of the driven member or hub with which they coact.

Figures 7 and 8 are views similar to Figure 1 of slightly different forms of the vibration dampener from that shown in Figure 1.

Figures 9 and 10 are sectional views through the dampening member taken on line 9—9 and 10—10 respectively showing the taper of said member.

This motion transmitting element comprises inner and outer concentrically arranged parts and vibration-dampening motion-transmitting means between said parts including a resilient member capable of lineal extension and contraction, anchored at one end to one of said parts and at its other end to the other of said parts, one of said parts being provided with a braking surface and the resilient member with a shoe for coacting with said surface and normally spaced therefrom and movable into coaction therewith by relative rotary movement of said parts which causes the resilient member to extend or contract or distort. In order that vibrations originating either in the driving part or the driven part of the clutch may be dampened a double member or two members are employed which are oppositely disposed to each other, one acting to apply a brake when the driving part imparts an impulse to the driven part and the other, when the driven part imparts a back driving force to the driving part, as when the propeller shaft of the vehicle tends to run faster under the momentum of the vehicle than the engine. Preferably, the two members are formed integral, or the two members are in a single unit or element.

1 designates the outer part or disk of the plate of a clutch; 2, the inner part or hub which is splined on a shaft. The shaft is usually the drive shaft of the transmission gearing of the vehicle, or the stem of the stem gear of the transmission gearing of the vehicle. The hub is splined on its shaft in the usual manner and is shiftable axially thereof in any well known manner. It will be understood that this clutch element is held in its engaged position by a clutch spring or springs acting through levers on a pressure ring and is disengaged by throw-out mechanism, usually operated by the clutch pedal of a motor vehicle. The disk 1 is provided with friction rings 3, 4 on opposite sides thereof for coacting respectively with the usual abutment or friction surface in the fly wheel of the engine of the vehicle and with the usual pressure ring acted on or by the clutch spring or springs through clutch levers.

As here illustrated, the disk 1 and hub 2 are so assembled that an annular chamber 5 is formed between them in which the vibration or torque dampening means is located and for the purpose of illustration, the hub 2 is shown as formed with an annular flange 6 projecting into the annular chamber 5, and the disk is formed with rings or plates 7 and 8 on opposite sides thereof and around its central opening, these rings or plates 7 and 8 have offset portions 9, 10 which confine the annular chamber. The flange 6 extends into the chamber and is located along one of the side walls thereof as along the offset portion 9 of the plate or ring 7.

In the illustrated embodiment of my invention, two vibration or torque dampening members are used, one to dampen vibration being transferred to the hub 2 from the disk 1, when the disk 1 rotates ahead of the hub 2, and the other being oppositely disposed to dampen vibration from the hub 2 to the disk 1, when the hub 2 rotates ahead of the disk 1. The members 11, 12, constitute oppositely disposed arcuate arms of the dampening means.

11 and 12 designate said arms or members, each of them being arcuate in general form and anchored at like ends to the driving part or disk 1 and at their other ends to the driven part or hub 2, each of these members being preferably a forging of resilient or spring metal or steel and are provided at like ends with laterally extending lugs or trunnions 13, 14 respectively, which fit, with a little looseness, openings or bearings 15 and 16 in the disk 1 or the offset portion 10 of the ring or plate 8; and with similar laterally extending lugs or trunnions 17 and 18, which fit into openings 19 and 20 in the annular flange 6 of the hub, so that each of the resilient arcuate members 11, 12 is anchored at its opposite ends respectively to the disk 1 and the hub 2. The lugs 17, 18 also extend entirely through and beyond the flange 6 into an arcuate slot 21 in the offset portion 9 of the ring or plate 7, the slot being long enough to permit expanding and flattening movement of or lineal extension and shortening of the arcuate members 11 and 12 relatively to the disk 1, and may act as a stop to limit the contracting movement and also to form a key connection between the disk 1 and the hub 2, in the event the members 11 and 12 should break and become functionless, as a dampener. Each member 11 and 12 also has a tail projecting beyond its anchor points 13 and 14, which tail is provided with a brake shoe 22 or 23 for coacting with a braking surface on the other part, in this instance, the periphery of the hub 2. The surface of the brake shoe, as seen in Figure 6, is in an arc of greater radius than the periphery of the hub 2 but tangent or substantially tangent thereto as at 24. The center C of the arc of the brake shoe surface is located beyond the center C' of the periphery of the hub and in a diameter cutting the point of tangency 24. Thus, the brake shoe surfaces are normally spaced apart from the periphery of the hub 2 and are brought into gradual engagement therewith during the action of the members 11 and 12 with a rolling, squeezing action.

In the illustrated embodiment of my invention, the members 11 and 12 are a single unit or element and rigid, except for the resiliency of the metal. The unit or element is in the general form of a horse shoe with arcuate branches or arms, which embrace the hub 2, the arms being anchored at their free ends by the trunnions 17, 18 to the flange 6 of the hub 2, and the trunnions 13 and 14 projecting laterally from the intermediate part of the horse shoe formation and spaced apart on opposite sides of the median line thereof. The intermediate portion of the unit formation between and slightly beyond the trunnions 13, 14 theoretically form the tail pieces of the arms or members 11, 12 and the tail piece for the arm 11 has the brake shoe surface 22 and the tail piece for the member 12 has the brake shoe surface 23.

As seen in Figures 9 and 10, the members 11, 12 are tapered along their inner and outer edges toward the points they are anchored to the hub or the flange 6 thereof, but are of substantially the same thickness in a direction parallel to the axes of the anchor points, that is, they are oblong in cross section but the major diameter of the oblong decreases toward one end of the member 11 or 12, and the minor diameter remains constant. This formation distributes the bending forces, both compression and tension, and avoids breaking of the member 11 or 12.

In operation, assuming that the parts are rotating in the direction of the arrow A (Figure 1), that is, anti-clockwise, the motion is normally transmitted from the disk 1 to the hub 2 through the thrust of the disk 1 against the trunnions 13, 14, and through the thrust and tension on the arcuate arms 11, 12 and trunnions 17, 18 to the hub 2. When an accelerating impulse is imparted to the disk 1, as at the time the cylinders of the engine are firing, the additional force applied to the trunnions 17, 18 causes the member 11 to bow outwardly and the member 12 to straighten and a slight relative rotary movement to occur between the disk 1 and the hub 2 and hence, the trunnion 13 which is at a fixed point on the driving disk 1 is caused to move slightly toward the trunnion 17, which is fixed to the flange 6 of the hub 2 and the trunnion 14 is caused to move slightly away from the trunnion 18. It is the excess force supplied by the driving part, or disk 1, that causes this relative movement and against the resiliency of the arcuate member 11 bowing outwardly and the member 12 to straighten. This sets up a warping, or pivotal action, about the axis of the lug 13, or a pivotal strain in the intermediate part of the unit formation, causing the brake shoe surface 22 to pinch inwardly and snub on the hub 2 and dampen the vibration. The reverse of this action takes place when a back driving impulse is transmitted from the hub 2 to the disk 1, the arm 12 then bowing farther outward and the arm 11 straightening inward and applying the brake shoe 23. The snubbing action may be due to a slight shifting of the hub 2 radially, or laterally, due to play between the hub 2 and its shaft, or between the splines of the hub and shaft. Although the splines fit with a sliding fit as accurately as possible, nevertheless, there is some play between them. The fact that the vibration dampener member is fixed or anchored at spaced points to the driving part 1 and hub 2 so that the force is applied eccentric to the axes, tends, or might tend to shift the hub radially when an impulse is applied thereto. After many experiments and practical uses, applicant is uncertain as to whether or not either or both of the above operations takes place, but is certain that whatever does take place results in a highly satisfactory, snubbing, dampening action.

These back drive impulses from the hub 2 to the disk 1 occur when the propeller shaft of the vehicle tends to run faster than the engine, as when coasting or under conditions analogous to coasting. It is believed unnecessary to go into the various conditions to which torque and vibration dampeners are subjected in a motor vehicle, as these are well known.

During the warping of the arms or members 11, 12 where one, as for instance, 11 is being bowed outwardly and the other being straightened inwardly or a force applied thereto tending to effect such warping, a warping pivotal strain is applied to the portions between the trunnions 13 and 14. For instance, a force tending to bow outwardly the arm or member 11 and straighten the member 12 causes the member 11 to be subjected to a pivotal or warping strain about the axis of the trunnion 13, and the force tending to straighten the member 12 acts in conjunction with the force tending to bow the member 11 increasing the warping pivotal strain and hence applying the brake shoe 22 against the periphery of the hub 2, and the reverse of the operation takes place when the member 12 tends to bow outwardly and the member 11 tends to straighten, causing the shoe 23 to snub on the hub 2.

In Figure 5, the vibration dampening arms 111 and 112 are shown as provided with brake shoes 122 and 123 toward the intermediate part of the arms instead of adjacent the anchoring points or pivots 13, 14, and these brake shoe surfaces may be located anywhere along the arc, although the action in ordinary uses are more satisfactory when located near the trunnions or anchor points 13, 14, as the snubbing or braking force is applied with a squeezing or pincher-like action instead of a more abrupt sudden action, that is, it is more gradually applied. The operation of the form shown in Figure 5 is the same as that shown in Figure 1. That is, when the torque is applied in one direction, so as to compress or bow outwardly the member 111 and to stretch the member 112, the shoe 122 will be applied to the hub with a snubbing action, and when the torque tends to bow outwardly the member 112 and to stretch the member 111, the shoe 123 will be applied to the hub with a snubbing action.

In Figure 7, the vibration dampener member is shown as circular or in the form of a closed horse-shoe or ring provided with two arms 211 and 212 anchored at 213, 214, respectively, to the disk 1 and at 217 to the flange 6 on the hub 2, these anchoring points being trunnions or pins and the trunnion or pin 217 extending into an elongated slot 219 in the flange 6, the slot permitting play of the pin 217 during warping or expansion or contraction of the arms 211, 212 and also forming a key connection between the hub and a disk, in the event of breakage of the members 211, 212.

In Figure 8, the arms 311 and 312 are anchored by a single trunnion or pin 313 instead of two trunnions or pins 13, 14 or 213, 214, and this construction is substantially the same as that shown in Figure 7, with the exception of the single trunnion or pin 313 being used instead of two spaced apart trunnions or pins 213, 214. In both Figures 7 and 8, the snubbing surfaces 22 and 23 are the same as in Figure 1 or 6.

In any form of my invention, each member 11 and 12, or its equivalent constitutes a connecting rod between the driving part and the driven part extending crosswise of the axis of said part, the connecting rod having a sort of cantilever action and being expansible and contractile, or capable of extending and shortening in a straight line between the points it is connected to the driving and driven parts against a spring resistance and the brake shoe of said member constitutes means for snubbing on one of said parts during the extending and shortening of the connecting rod.

What I claim is:

1. In a motion transmitting element comprising inner and outer concentrically arranged parts, the combination of vibration-dampening motion-transmitting means between said parts comprising a resilient, lineal extensible and contractile member between said parts and around the axis of said parts, said member extending less than a complete circle around the inner part and being anchored at spaced apart points to said parts, at one point to one part and the other to the other part, said member carrying a raised brake for coacting with one of said parts and normally out of coaction therewith and movable into engagement therewith by the relative rotating of said parts and the consequent change in the distance between said anchoring points.

2. In a motion transmitting element comprising inner and outer concentrically arranged parts, the combination of vibration-dampening motion-transmitting means between said parts comprising arms, each anchored at one end to one of said parts and at its other end to the other of said parts, said arms being normally arranged concentric with the axis of said parts and oppositely disposed with respect to each other, whereby they embrace the inner part, one of said parts being provided with a braking surface and each arm with a shoe for coacting with said surface and normally spaced therefrom and so arranged that rotary movement of one part ahead of the other causes the brake shoe of one arm to coact with said braking surface and relative rotary movement of the other part ahead of the first part causes the brake shoe of the other arm to coact with the braking surface.

3. In a motion transmitting element comprising inner and outer concentrically arranged parts, the combination of vibration-dampening motion-transmitting means between said parts comprising a resilient closed substantially circular member anchored at diametrically opposite portions respectively to said parts and having brake shoes movable into engagement with one of said parts during distortion of the member.

4. In a motion transmitting element comprising inner and outer concentrically arranged parts, the combination of vibration-dampening motion-transmitting means between said parts including a resilient distortable element extending around the axis of said parts and anchored thereto at spaced apart points, one of said parts being provided with a brake surface and said resilient element with a raised brake shoe means for coacting with said surface and normally spaced therefrom and movable into coaction therewith by the relative rotary movement of said parts causing said element to distort out of its normal curvature.

5. In a motion transmitting element comprising inner and outer concentrically arranged parts, the combination of vibration-dampening motion-transmitting means between said parts including a resilient distortable element interposed between said parts and extending around the inner part, said element being anchored at spaced apart points to said parts respectively, the inner part being provided with a peripheral brake surface and said element with brake shoe means for coacting with said surface and normally spaced therefrom and movable into coaction therewith by relative rotary movement of said parts causing the resilient element to distort out of its normal curvature.

6. In a motion transmitting element comprising inner and outer concentrically arranged parts, the combination of vibration-dampening motion-transmitting means between said parts including a resilient distortable element interposed between said parts and extending around the inner part, said element being anchored at spaced apart points to said parts respectively, the inner part being provided with a peripheral brake surface and said element with brake shoe means for coacting with said surface and normally spaced therefrom and movable into coaction therewith by relative rotary movement of said parts causing the resilient member to distort out of its normal curvature, the surface of the brake shoe means being in an arc tangent to the periphery of the inner member and of greater radius than the peripheral surface of the inner member.

7. In a motion transmitting element comprising inner and outer concentrically arranged parts, the combination of vibration-dampening motion-transmitting means between said parts comprising an element having arms extending around the inner part substantially concentric with the axis of the said parts, said arms being anchored to said parts respectively at points on opposite sides of the axis of the said parts whereby said arms embrace the inner part and are oppositely disposed with respect to each other, one of said parts being provided with a braking surface and each of said arms being provided with a shoe for coacting with said surface and being normally spaced therefrom and so arranged that rotary movement of one part ahead of the other causes one brake shoe to coact with the braking surface upon warping distortion of said arms and relative rotary movement of the other part ahead of the first part causes the other brake shoe to coact with the braking surface.

8. In a motion transmitting element comprising inner and outer concentrically arranged parts, the combination of vibration-dampening motion-transmitting means between said parts comprising a resilient distortable element arranged substantially concentric with the axis of said parts and having arms oppositely disposed with respect to each other and embracing the inner part, said arms being rigidly secured together at corresponding ends whereby they form a unit and said unit being anchored at substantially diametrically opposite points located at the ends of the arms, to the inner and outer members respectively, the anchoring point between the unit and one member being located at the intermediate part of the unit and said intermediate part being formed with an arcuate brake face for engaging the periphery of the inner part upon distortion of the dampening element.

9. In a motion transmitting element comprising inner and outer concentrically arranged parts, the combination of vibration-dampening motion-transmitting means between the parts comprising a member anchored at spaced apart points to both of said parts and having oppositely acting resilient means between the anchoring points, one resilient means extending in a clockwise direction from its anchoring point to one of said parts and the other resilient means extending in an anticlockwise direction from the anchoring point to the same part, said resilient means embracing and extending around the inner part, and said member being provided with brake shoe means for snubbing on one of said parts during relative rotary movement of the parts.

10. In a motion transmitting element comprising inner and outer concentrically arranged parts, the combination of vibration-dampening motion-transmitting means between said parts, a member anchored at spaced apart points to both of said parts, the anchoring points being located on diametrically opposite sides of the axis of said parts, whereby said element is in the general form of a ring, said member being yieldingly extensible and contractile under the influence of relative rotary movement of said parts, and said member having a pair of snubbing means, one acting on one of said parts when the outer part temporarily rotates faster than the inner part, and the other snubbing part acting when the rotation of the inner part is temporarily faster than the rotation of the outer part, said snubbing means being operable by the distortion of said member during such relative movement.

CHARLES B. SPASE.